C. E. Merrifield.
Gate-Latch.
No. 73,624. Patented Jan. 21, 1868.
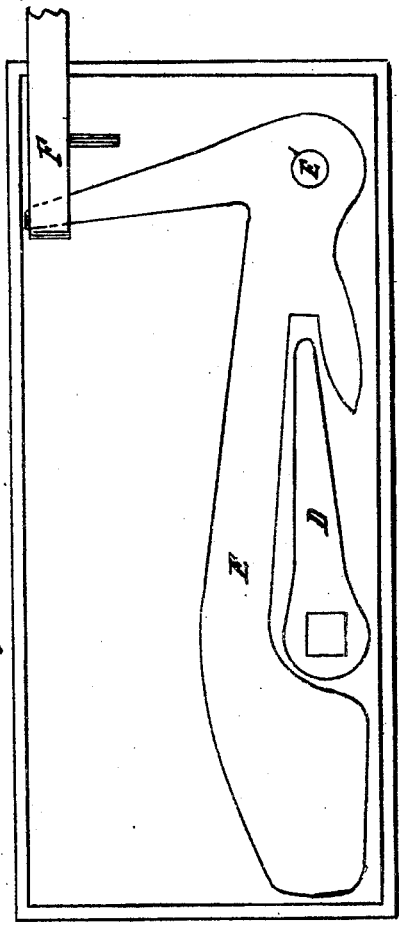
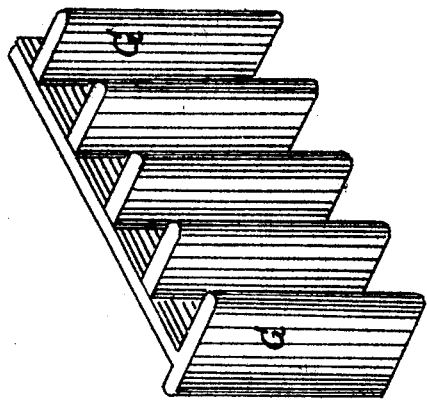
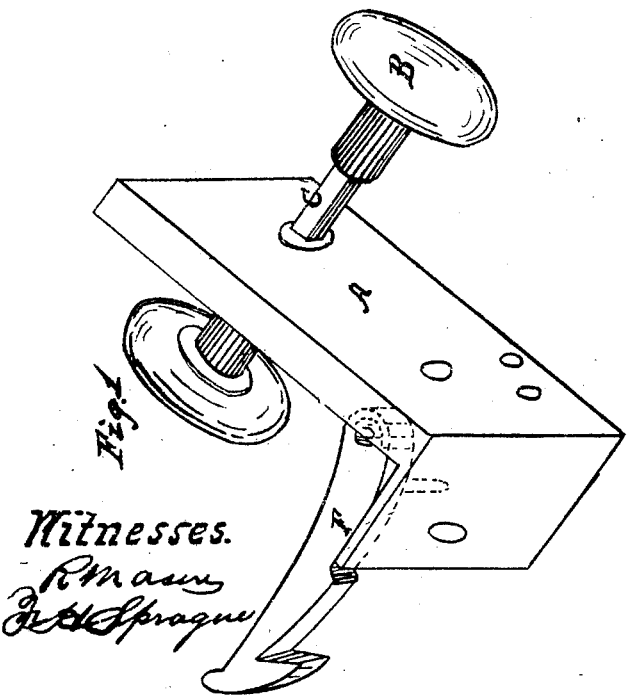
Witnesses.
R Mason
F H Sprague
Inventor:
C. E. Merrifield
by
D. P. Holloway & Co
his Attys.

United States Patent Office.

CHARLES E. MERRIFIELD, OF INDIANAPOLIS, INDIANA.

Letters Patent No. 73,624, dated January 21, 1868.

IMPROVED GATE-LATCH.

The Schedule referred to in these Letters Patent and making part of the same.

TO ALL WHOM IT MAY CONCERN:

Be it known that I, C. E. MERRIFIELD, of Indianapolis, in the county of Marion, and State of Indiana, have invented a new and useful Improvement in Gate-Latches; and I do hereby declare that the following is a full, clear, and exact description of the same, reference being had to the annexed drawings, making part of this specification, in which—

Figure 1 is a perspective view of the latch.

Figure 2 is a side elevation of the mechanism, and

Figure 3 a perspective view of the catch.

The same letters are employed in all the figures for the indication of the same parts.

This invention is intended to provide against the failure of gate-latches to operate, on account of the shrinking or sagging of the gate, and consists in the employment of a horizontally-operating latch, acting in combination with a catch formed by a series of elongated parallel flanges.

The following description will enable those skilled in the art to construct my improved latch and catch.

In the annexed drawings, A is the case of the latch, B the knobs for operating the latch, and C the shank, to which is attached the arm D, which oscillates vertically as the handle is turned. F is a bell-crank lever, attached to the case by a pivot at E', upon which it may swing as the horizontal arm is raised by the arm D, which fits into a recess formed in the bottom of the lever, and shaped as shown in fig. 2. The short arm is vertical, and fits into a recess in the short arm of the latch F, which is pivoted to a lug on the inside of the case, as indicated by dotted lines in fig. 1. The long arm terminates with a hook and bevelled point, as shown in fig. 1. The latch swings horizontally on its pivot as it is moved by the bell-crank lever and other connected parts of the mechanism. This latch is fastened to the gate.

The catch G is shown in fig. 3. It is a plate, to be fastened to the gate-post, from the face of which projects a series of parallel flanges, inclined towards the direction in which the gate swings in closing. When the latch strikes against the flanges, it is forced back, and passes from one to another, until the gate is closed. The weight of the long arm of the lever E being sufficient to actuate the latch, no springs are necessary, and the hook on the latch will be forced against the flanges by this pressure.

Should the gate shrink, or the post fall away from it, the latch will still catch against some of the flanges, the width of the plate being sufficient to provide against this change.

Should the gate sag, the length of the plate and flanges should be sufficient to meet this case also.

What I claim as my invention, and desire to secure by Letters Patent, is—

1. The catch G, formed by a series of parallel flanges, in combination with a horizontally-swinging latch, F, substantially as described.

2. The combination and arrangement of the shank C, arm D, bell-crank-formed lever E, and latch F, substantially as set forth.

C. E. MERRIFIELD.

Witnesses:
W. P. WERDEN,
V. H. HACKLEMAN.